INVENTOR.
ALFRED HEILBRUNN

BY Mark Basseches

ATTORNEY

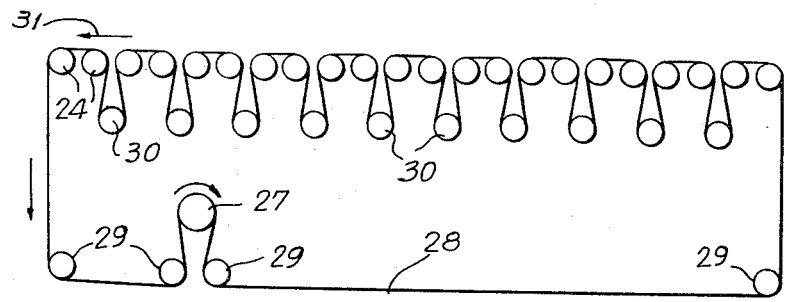
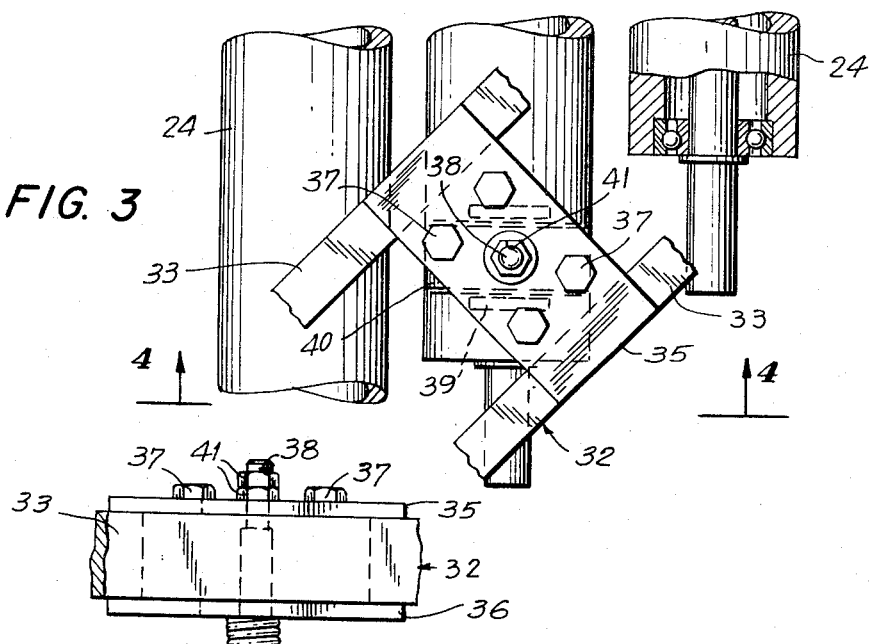
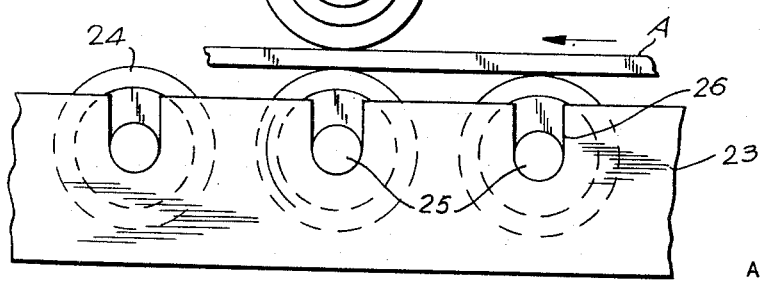

INVENTOR.
ALFRED HEILBRUNN
BY
Mark Basseches
ATTORNEY

United States Patent Office 3,355,006
Patented Nov. 28, 1967

3,355,006
ARTICLE CONVEYOR DEVICE
Alfred Heilbrunn, Scranton, Pa., assignor to Chromographic Press, Inc., Hamden, Conn., a corporation of Connecticut
Filed July 28, 1966, Ser. No. 568,437
11 Claims. (Cl. 198—105)

ABSTRACT OF THE DISCLOSURE

An article feed device for progressively advancing an article along first and second linear paths without varying the orientation of the article, said paths being angularly related to each other, including first and second article conveyors disposed at an angle to each other, and means for causing the article to conform to the direction of feed of the first and second conveyors, said means being so disposed with respect to said conveyors and each other that the article is simultaneously released from the influence of the first conveyor and placed within the influence of the second conveyor.

---

This invention relates to an article conveyor device, and more particularly to a device for advancing articles in a predetermined, non-linear path without varying the orientation of the articles.

More particularly, this invention relates to conveyor device for articles, and particularly flat articles, whereby a series of closely spaced articles on an input conveyor may be serially advanced along a first path and shifted to a second path angularly related to and intersecting the first path, without disorientation of the articles.

The invention further relates to a device of the class described wherein the articles are continously advanced, i.e. are advanced without pauses or dwell times at intermediate positions.

The invention further relates to a device of the class described which does not require for its operation means which engage the side edge or edges of the articles in the course of advancement and may thus be readily adjusted for accommodating articles of a variety of sizes.

Heretofore article advancing means whereby articles are shifted from a first to a second path have embodied drawbacks which greatly limit their usefulness. In one such type of apparatus, articles fed along a conveyor are directed against deflector means which change the path of movement of the articles, and in some instances deposit the articles on a second conveyor. Such devices have the disadvantage of disorienting the articles as respects their initial positioning on the input conveyor, i.e. the northernmost edge of the article when the same is disposed on the input conveyor is no longer the northernmost edge of the article when the same is on the output conveyor.

In a second type of known article feed device, articles are advanced to a change station by a first conveyor. The articles are picked up at the change station by a second conveyor or the like travelling in an angular path with respect to the direction of travel of the first conveyor.

Typically, in devices of this type the articles themselves trigger a switch or the like which shuts down the first conveyor and activates the second conveyor to effect the desired transfer. While devices of this sort are able effectively to maintain the orientation of the fed articles, it is impossible, with such devices, to feed articles continuously and in closely spaced relation since, as will be readily recognized, there is a protracted dwell time while the articles remain at the change station. If articles were closely spaced in such devices, they would accumulate and overlap at the change stations. Thus, devices of this second mentioned type have low feed capacity.

Other types of transfer devices embodying specific article gripper or pusher means are effective for advancing articles in a predetermined, non-linear path without modifying the orientation of the articles. However, such devices depend upon paddles, pushers, claws or the like which grip the sides of the advanced articles and either lift or cradle the articles, to prevent disorientation. Such devices, in addition to bring complicated and extremely expensive, are subject to the principal disadvantage that they are difficult or impossible to adjust for feeding articles of different sizes.

It is therefore an object of the present invention to provide an article feed device for feeding flat articles, and particularly sheets, along a first path and shifting said articles to a second path, without affecting the orientation of said articles.

It is a further object of the invention to provide a device of the class described wherein the feed of such articles is continuous and uninterrupted, and whereby the articles may be serially and closely spaced on the input conveyor.

Still a further object of the invention is to provide a device of the class described which may be readily adjusted for feeding articles of a wide variety of sizes.

A still further object of the invention is the provision of a device of the class described which is of simple construction and which operates without the necessity for advancing the articles by engaging the edges thereof.

A still further object of the invention is the provision of an article feed device of the class described and including a fine orienting mechanism for precisely adjusting the orientation of the articles passing through the device so that any slight disorientation which might have occurred in the course of article feed is ultimately corrected.

To attain these objects and such further objects as may appear herein or be hereinafter pointed out, reference is made to the accompanying drawings, forming a part hereof, in which:

FIGURE 2 is a schematic side elevational view of the drive mechanism for the intermediate advancing portion of the device;

FIGURE 3 is a magnified plan view, partly in section, of the portion of the device disposed between the arrows 3—3, FIGURE 1;

FIGURE 4 is a side elevational view taken in the direction of the arrows 4—4, FIGURE 3;

Figure 1:
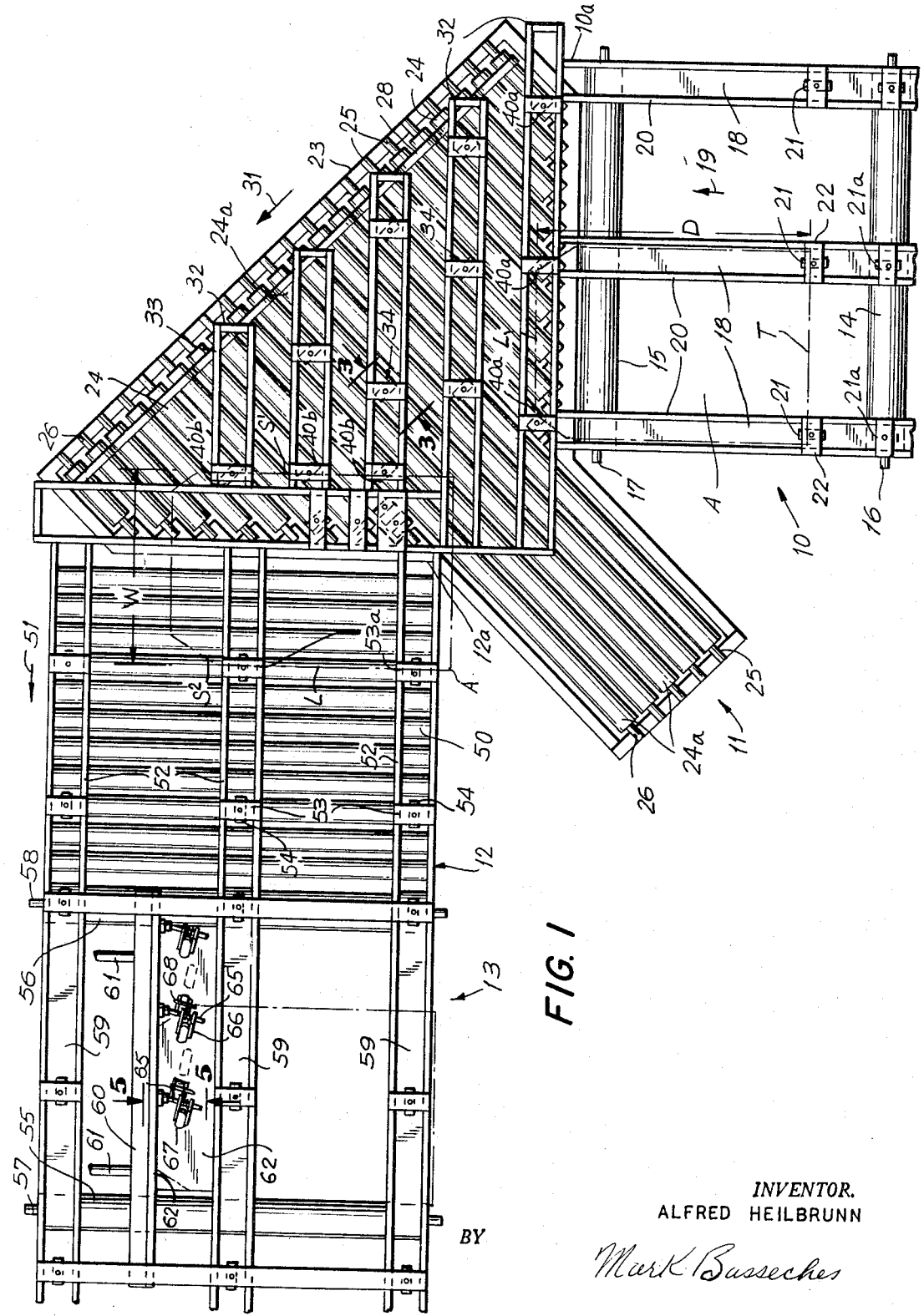
FIGURE 1 is a plan view of an article feed device in accordance with the invention.

In accordance with the invention, the article feed device includes an input conveyor 10, an intermediate conveyor 11 and an output conveyor 12. The output conveyor 12 includes a fine orientation section 13.

It is the object of the present invention to feed a series of articles A into the input conveyor 10, and shift their direction of movement to that of the output conveyor 12 without disorientation of the article.

The input conveyor 10 includes a spaced pair of roller members 14, 15, mounted on the shafts 16, 17, which are rotatably supported on the framework of the device, the shafts being disposed in a horizontal plane. Three endless belt members 18 are disposed over the upper surfaces of the rollers 14, 15, the belt members 18 being substantially equally spaced apart. Means (not shown) are provided for driving the belts 18 at any desired speed, it being understood that the belts are travelling in the direction of the arrow 19 shown in FIGURE 1.

Supported from the framework of the device, directly above the belts 18 are three rail members 20 disposed in parallelism with the direction of movement of the belts. On each of the rail members 20 there is adjustably mounted an anti-friction hold down roller 21. The hold down rollers 21, which rotate about axes normal to the direction of movement of the belts 18, are themselves supported on bracket portions 22 which may be variously positioned longitudinally of the rails 20, as by threaded locking means or the like.

The lowermost portions of the rollers 21 are disposed substantially tangentially to the belts 18 for the feeding of sheet articles, it being understood that where articles of substantial thicknesses are to be fed, the device may be modified by permitting vertical adjustment of the rollers so as to provide spacing between the lower edges of the rollers and the belts.

The intermediate conveyor 11 incorporates a frame member 23 which rotatably supports the driven intermediate feed rollers 24. The feed rollers 24 have their uppermost surfaces disposed in coplanar alignment with the uppermost surfaces of the belts 18 of the input conveyor 10.

The rollers 24 include laterally extending shafts 25 which are mounted for rotation within anti-friction seats 26 supported on the framework 23, the axis of rotation of the rollers 24 being disposed at an angle to the axis of rotation of the shafts 16, 17 of the rollers of the input conveyor 10.

In the illustrated embodiment, the input and output conveyors 10 and 12, respectively, are angularly oriented at 90° to each other, the intermediate conveyor 11 being offset at an angle of 45° to each of the aforementioned conveyors. However, it will be readily recognized that the invention is not limited to a 90° offset.

Mechanism which may optionally be powered by the same source or be independent of the drive mechanism for the input conveyor 10 is provided for driving the rollers 24 at a selected speed. This mechanism, which is best seen in FIGURE 2, incorporates an input or drive pulley 27 which is rotated in the direction of the arrow and which drives an extended belt 28 threaded over the drive rollers 24 and a series of idler rollers 29 which function to define a flight or path for the belt 28.

The belt passes under the idler rollers 29 and, in accordance with the illustrated embodiment, passes over a pair of the rollers 24 and thence downwardly between each adjacent pair of said rollers 24, beneath the under surface of tensioning rollers 30 which function to maintain an even tension in the belt as it passes over the rollers 24, so as to assure contact of the belt with each said roller. Optionally, the tensioning rollers or pulleys 30 may comprise dancers, i.e. the rollers may be supported for vertical and rotary movement within support slots in a manner well known, to assure equal tension on the pulley throughout the system and prevent slippage which might occur through elongation of the belt.

From the foregoing it will be seen that each of the rollers 24 is driven in a direction to provide feed of articles supported on the rollers 24 in the direction of the arrow 31—see FIGURE 1.

Supported above the rollers 24 is a series of rail members 32 comprising spaced parallel tracks 33, the tracks being aligned perpendicular to the direction of travel of articles on the conveyor 10 and parallel to the direction of travel of articles on the conveyor 12. A series of anti-friction hold down roller assemblies 34, shown in detail in FIGURES 3 and 4, is supported on the rails 32.

The hold down assemblies include upper and lower plates 35, 36, respectively, disposed adjacent the upper and lower surfaces of the spaced tracks 33, longitudinal adjustment of the assemblies with respect to the tracks being provided by lock bolts 37 extending between the plates 35, 36 and actuatable to clamp the plates against the upper and lower surfaces of the tracks 33.

Each of the assemblies 34 carries a roller support bolt 38 which extends through the plates 35, 36, the lower end of the bolt 38 carrying a generally U-shaped yoke 39 within which is mounted an anti-friction roller 40, vertical adjustment of the rollers being permitted by adjustment and locking nuts 41.

A spring member 42 is biased between the lower plate 36 and the upper face of the yoke 39 so as to bias the rollers 40 downwardly, it being understood that the rollers are movable toward and away from the lower plate against the spring tension provided by the spring 42. The roller yokes 39 are keyed to the roller assemblies 34 so as not to be rotatable about a vertical axis, although the rollers 40 are free to rotate about the horizontal axis.

As best seen in FIGURES 1 and 3, the rollers 40 have their axis of rotation aligned in parallelism with the axis of rotation of the drive rollers 24 of the intermediate conveyor 11.

As seen from FIGURE 1, the length of the various rollers 24 is graduated so as to fit into the space defined between the terminal end 10a of the input conveyor and the entrance end 12a of the output conveyor. Preferably, several of the central rollers 24a of the intermediate conveyor are longitudinally elongated to provide support for widthwisely extended articles to be fed by the conveyor.

The output conveyor 12 includes a series of drive rollers 50 supported on the framework (not shown) for rotation about a horizontal axis. The upper surfaces of the drive rollers 50 are disposed in the same horizontal plane as the upper surfaces of rollers 24 of conveyor 11 and the belts 18 of the input conveyor 10.

The rollers 50 are rotated in the direction of the arrow 51—see FIGURE 1—by any conventional means, the speed of rotation of the rollers being variable and controllable independently of the speed of the conveyors 10 and 11.

The output conveyor 12 includes three laterally spaced-apart rails 52 which are disposed in parallelism with the direction of movement of articles on the conveyor 12. The rails are spaced apart equally, and are supported on the framework (not shown) of the output conveyor. The rails 52 support a series of anti-friction roller members 53 which may be lengthwisely adjusted along the rails to any desired position.

The roller components 54 of the assemblies 53 are disposed so that their axis of rotation is parallel with the axis of rotation of the rollers 50. Since the construction of the rails 52 and roller assemblies 53 may be identical to the construction of the rail assemblies 32 and roller assemblies 34, respectively, further description thereof is not believed to be required.

The fine orientation section 13 comprises essentially a continuation of the output conveyor 12. This section includes a pair of driving rollers 55, 56, which are longitudinally spaced apart and which have shafts 57, 58 mounted for rotation on the frame of the output conveyor. Three spaced-apart endless belts 59 are disposed over the rollers 55, 56, the belts extending longitudinally over the upper surfaces of said rollers. Preferably the belts 59 driven by drive means so as to move at the same rate of speed as the rollers 50 of the output conveyor. It will be noted that the extended rail members 52 are superimposed over the belts 59.

Figure 5:
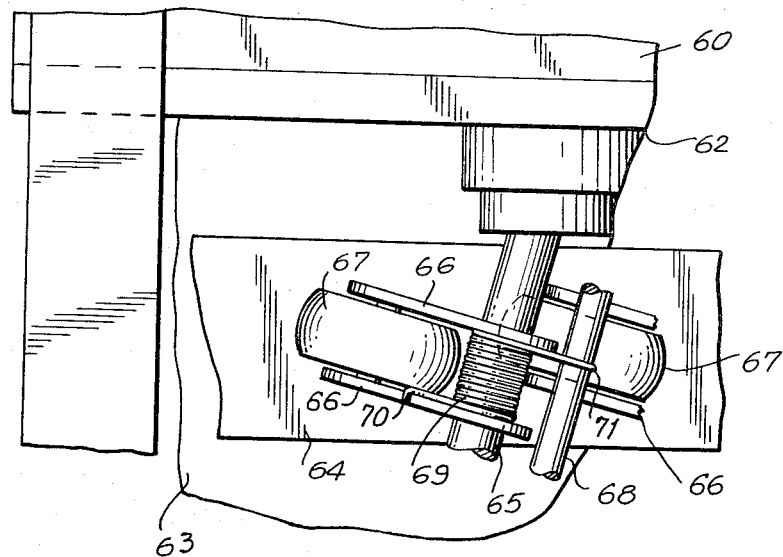
FIGURE 5 is a magnified plan view of the segment of the apparatus shown between the arrows 5—5, FIGURE 1.

An alignment fence 60 is supported on struts 61 extending laterally from the framework. The struts 61 are adjustable so that the fence 60 may be shifted laterally. The fence 60, as best seen from FIGURES 5 and 6, includes a vertically directed alignment wall 62 disposed in parallelism with the direction of movement of articles advancing across the section 13, the fence carrying a horizontal support floor 63 projecting laterally from the alignment wall 62.

A laterally shiftable belt 64 is passed over the rollers 55, 56 and is adjusted in accordance with the adjustment of the fence so as to overlie the support floor 63 in the area adjacent the surface 62.

A series of stub shafts 65 extend laterally from the alignment surface 62, the shafts being directed at an angle with respect to the shafts 57, 58 of the rollers 55, 56, respectively. On each of the shafts 65 there is supported a spaced pair of link arm members 66, mounted for pivotal movement about the shaft, the link arm members having alignment rollers 67 disposed and rotatably mounted therebetween.

Bracket support members 68 are fixed to each of the shafts 65 in trailing position with respect thereto. About each of the shafts 65 between the link arms 66 is mounted a coil spring member 69, one end 70 of which is outwardly bent to lie against a side surface of a link arm 66 and the other end 71 of which is disposed over the support members 68. The springs 69 are tensioned so that the link arms are biased downwardly or counter-clockwisely when viewed in the position of FIGURE 6.

Adjustments

The device is initially adjusted in accordance with the size of the articles A which are to be fed through the apparatus. This adjustment is accomplished in the illustrated embodiment by positioning the brackets 22 carrying the hold down rollers 21 longitudinally along the rails 20 in such a manner that the point of tangency of the rollers 21 with belts 18 is spaced from the point of tangency of the initial set of anti-friction rollers 40a, with rollers 24 a distance D—see FIGURE 1—which is substantially identical to the length of articles A.

In like manner, the first set of roller assemblies 53a of the output conveyor are adjusted along rails 52 so that the point of tangency of the rollers 54 carried thereby with the support surface of the output conveyor 12 is spaced from the point of tangency of the trailing rollers 40b with the roller members 24 of the intermediate conveyor 11 a distance equal to the width W of said articles A. It will be understood that the last mentioned adjustment may be effected by a movement of the roller assemblies of either the output conveyor 12 or the intermediate conveyor 11.

An important factor in the efficient use of the device lies in the inter-relationship of the speeds of the respective conveyors 10, 11, 12. While these conveyors may be driven from a common power source, it is necessary, where the conveyors are to be used for handling articles of various sizes, that the speeds be independently adjustable. The speed of the input conveyor 10 is preferably related to the speed of the output conveyor 12 by a proportion which is a function of the relation of the length of the article to the width of the article. For instance, if the length of the article is 2 feet and the width is one foot, the speed of the article on the output conveyor 12 must be at least one-half as great as the speed of the input conveyor, to avoid overlapping of the articles.

Similarly, the speed of the intermediate conveyor 11 should be adjusted so as to advance the articles across the intermediate conveyor 11 at a rate so that the components of movement of the articles on the conveyor 11 in the lengthwise and widthwise directions are at least as great as the rate of movement in such directions on the input and output conveyors, respectively.

The fine alignment section 13 is adjusted by shifting the fence assembly 60 laterally through adjustment of the struts 61, to align the vertical guide surface 62 of such assembly with the desired alignment of the lead edge L of articles A. In practice, the edge 62 is best disposed slightly outwardly (in an upper direction as shown in FIGURE 1) from the exact position of the edges L as they progress across the output conveyor 12. This is done since, as will be hereinafter more fully explained, the articles A are shifted slightly toward the fence as they pass along through the fine alignment section 13. The belt 64 is positioned along rollers 55, 56 so as to lie adjacent the surface 62.

Operation

Articles A, which are disposed in predetermined alignment and orientation, are fed into the input conveyor section 10, the articles being caused to advance with the belts 18 by a series of rollers 21a which urge the articles against the belts, thus assuring that they will move at the same speed as the belts. When the articles pass beneath the rollers 21, and the trailing edge T of the articles extend beyond said rollers, the articles will no longer be urged forwardly by the conveyor 10 but will pass to the control of the conveyor 11.

At the same instant as the articles are released by the rollers 21, they are engaged in the nip between the anti-friction hold down rollers 40a and the driven rollers 24 of the intermediate conveyor 11. As will be readily recognized, since the lead edge is simultaneously engaged by at least two said rollers 40a, the article will now be shifted in an angular direction (in the illustrated embodiment at 45° with respect to its previous direction of movement) and will traverse the intermediate conveyor 11 while still being maintained in its initial orientation.

At the same time as the trailing side edge S1 of the article is released from its position between the rollers 40b of the intermediate conveyor 11, the lead edge S2 is engaged by the nip between rollers of roller assemblies 53a and the driven support rollers 50 of the output conveyor 12. The article will continue to advance across the output conveyor 12 and will be fed to the fine alignment section 13.

Figure 6:
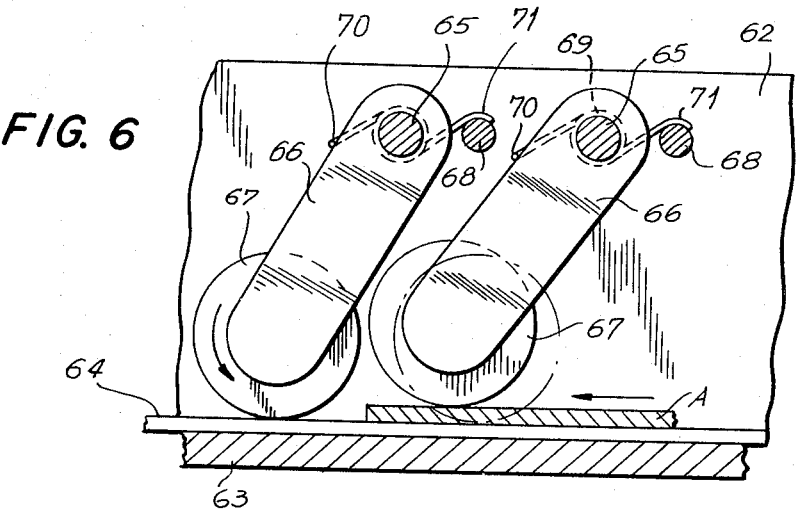
FIGURE 6 is a side elevational view of the apparatus of FIGURE 5.

The rollers 67 of the fine alignment section normally rest against the driven belt 64 of said section but, as shown in FIGURE 6, when the article A passes between the rollers 67 and belt 64, link arms 66 pivot upwardly (clockwisely as seen in FIGURE 6), pressing the article between the rollers and the belts 64. Due to the fact that shafts 65 are angled toward the vertical alignment surface 62 of the fence 60, the articles will tend to be shifted laterally toward the fence, thus urging the edge L of the article into contact with the vertical surface 62.

Preferably the pressure exerted by spring 69 is relatively light so as to avoid forcing the edge L against the surface 62 with a force sufficient to cause curling of the edge. It is important that the pressure exerted by the rollers 67 be light for the further reason that once the article surface L is aligned, there is bound to be some friction or slippage between the rollers 67 and the article surface.

From the foregoing it will be seen that articles introduced into the input conveyor 10 are advanced in such manner as precisely to retain the orientation of the articles while changing the path of the articles at a selected angle.

The device readily lends itself to adjustment, to enable the angular feed without disorientation of articles of a wide variety of sizes and shapes, only simple adjustments of the hold down rollers being required for such conversion.

The articles are moved continuously, and no loss of capacity, such as is introduced in devices which require dwell times, is experienced.

No complex grippers, paddles or other edge engaging means are required.

As noted previously, while the device is shown in conjunction with leading articles through a 90° change of direction, it will be readily recognized that the invention is not limited to such angle.

While the device is primarily intended to be used in conjunction with associated apparatus for performing various operations on the article while the same is advanced, no such associated apparatus is shown since the same is well known and its description would merely be surplusage. As an example of an important use to which the apparatus may be put, there may be mentioned gluing apparatus, folding apparatus or the like wherein glue strips or fold lines at predetermined angles to each other are to be formed.

While in the illustrated embodiment, conveyors of both the belt and roller type have been illustrated at various positions within the apparatus, it will be readily recognized that, depending upon the application, all belt conveyors or all roller conveyors may be utilized.

In like manner, in some applications it is advisable to employ a flat slip surface beneath the article and drive the article with live roller members, and such a construction is within the contemplation of this invention.

Having thus described the invention and illustrated its use, what is claimed as new and is desired to be secured by Letters Patent is:

1. A device for guiding a flat article progressively across the surfaces of first and second, angularly offset conveyors having coplanar drive surfaces without varying the orientation of said article, comprising first anti-friction, hold down means disposed above one said conveyor for pressing said article against said drive surface of said one conveyor, thereby to cause said article to advance with said surface until said article passes beyond said hold down means, and second, laterally extended hold down means disposed above the said drive surface of said second conveyor for simultaneously engaging the lead edge of said article at spaced points as the same passes from said first to said second conveyor, said first and second hold down means being spaced apart a distance equal to the length of said articles, whereby said article is transferred from the control of said first to the control of said second conveyor.

2. A device in accordance with claim 1 wherein said first and second hold down means comprise roller members yieldably urged toward said surfaces, said first and second roller members each having its axis of rotation disposed normal to the direction of movement of articles along said first and second conveyors, respectively.

3. A device in accordance with claim 2 wherein said first roller members are adjustably mounted for movement toward and away from said second roller members.

4. A feed device for continuously advancing flat sheet articles from a first linear path to a second linear path without varying the orientation of said articles and without mechanically engaging the edges of said articles to maintain said orientation, comprising input, output and intermediate conveyors, each said conveyor being angularly oriented to the other and each having horizontally disposed article support surface means for moving an article supported thereon longitudinally along said conveyors, said surface means of said conveyors being in coplanar alignment, the terminal end of said input conveyor being disposed adjacent the entry end of said intermediate conveyor and the terminal end of said intermediate conveyor being disposed adjacent the entry end of said output conveyor, first, second, third and fourth anti-friction hold down means disposed respectively adjacent the terminal end of said input conveyor, the entry end of said intermediate conveyor, the terminal end of said intermediate conveyor and the entry end of said output conveyor, said hold down means being movable toward and away from said surface means for pressing an article against said surface means, said first and second hold down means being spaced apart a distance substantially equal to the length of said article as it travels along said input conveyor and said third and fourth hold down means being spaced apart a distance equal to the length of said article taken in the direction of movement of said article along said output conveyor.

5. A device in accordance with claim 4 wherein said hold down means comprise roller members, each said roller member being mounted for rotation about an axis normal to the longitudinal axis of the conveyor over which it is disposed.

6. A device in accordance with claim 5 wherein said roller members are adjustably supported for longitudinal and lateral movement with respect to said conveyors.

7. A device in accordance with claim 4 wherein each said hold down means comprises a series of individual wheel members, said wheel members each being rotatable about an axis of rotation normal to the longitudinal axis of the conveyor over which it is disposed, the wheel members of said first and second hold down means being spaced apart and disposed on a line which is normal to the direction of movement of articles on said input conveyor, the wheel members of said third and fourth hold down means being spaced apart and disposed on a line which is normal to the direction of movement of articles on said output conveyor.

8. A device in accordance with claim 7 wherein said wheel members of said third and fourth hold down means are mounted on longitudinally extended mounting means disposed above said intermediate conveyor, said mounting means being disposed in parallel with one of said other conveyors, and adjustment means interposed between said wheel members and said mounting means for adjusting the position of said wheel members longitudinally of said mounting means.

9. A device in accordance with claim 4 and including a fence member on said output conveyor disposed in parallel with the longitudinal axis of said output conveyor and extending above said surface means, and guide roller means disposed adjacent said fence, said guide roller means being yieldably biased against said surface, said guide roller means being mounted for rotation about an axis parallel with said surface, said guide roller means being inclined toward said fence whereby articles passing between said surface means and guide roller means are urged against said fence.

10. A device in accordance with claim 4 wherein the speed of advance of articles on said input conveyor bears the same relation to the speed of advance of articles along said output conveyor as the length of said articles bears to the width of said articles.

11. A device in accordance with claim 10 wherein the speed of advance of articles on said intermediate conveyor in the direction of movement of said input conveyor is at least as great as the speed of advance of articles on said input conveyor in said direction, and the speed of advance of articles on said intermediate conveyor in the direction of movement of said output conveyor is at least as great as the speed of advance of articles on said output conveyor in said direction of said output conveyor.

References Cited

UNITED STATES PATENTS

| | | | |
|---|---|---|---|
| 3,010,565 | 12/1961 | Pasinski | 198—167 |
| 3,044,600 | 7/1962 | Miller | 198—167 |
| 3,174,613 | 3/1965 | Insolio | 198—127 |
| 3,262,545 | 7/1966 | Worsencroft | 198—165 |
| 3,268,059 | 8/1966 | Hill | 198—127 |

RICHARD E. AEGERTER, *Primary Examiner.*